United States Patent [19]
Kitamura et al.

[11] 4,116,078
[45] Sep. 26, 1978

[54] LOCK RELEASE MECHANISM FOR PUSH BUTTON LEVERS IN A TAPE RECORDER

[75] Inventors: Chiharu Kitamura; Bunichi Ando, both of Tokyo, Japan

[73] Assignee: Trio Kabushiki Kaisha, Tokyo, Japan

[21] Appl. No.: 808,541

[30] Foreign Application Priority Data
Jun. 23, 1976 [JP] Japan .............................. 51-82454

[22] Filed: Jun. 21, 1977

[51] Int. Cl.² ........................ G05G 1/02; G11B 15/18; E05B 47/00
[52] U.S. Cl. .................................... 74/10.27; 70/279; 74/483 PB; 200/5 EB; 360/74
[58] Field of Search ................. 74/10.27, 10.29, 10.31, 74/10.33, 10.35, 10.37, 483 PB; 360/74; 70/279; 200/5 EB

[56] References Cited
U.S. PATENT DOCUMENTS

| | | | |
|---|---|---|---|
| 3,322,908 | 5/1967 | Woodward | 200/5 EB |
| 3,684,297 | 8/1972 | Ban | 360/74 |
| 3,972,070 | 7/1976 | Fukayama et al. | 360/74 X |

*Primary Examiner*—Allan D. Herrmann
*Attorney, Agent, or Firm*—Lane, Aitken, Dunner & Ziems

[57] ABSTRACT

A lock releasing mechanism for push button levers such as used in a tape recorder. The mechanism includes an electromechanical releasing system and a distinct mechanical releasing system commonly operable by a manual operator. The mechanical system functions for lock releasing only if the electromechanical system fails to provide lock releasing.

2 Claims, 3 Drawing Figures

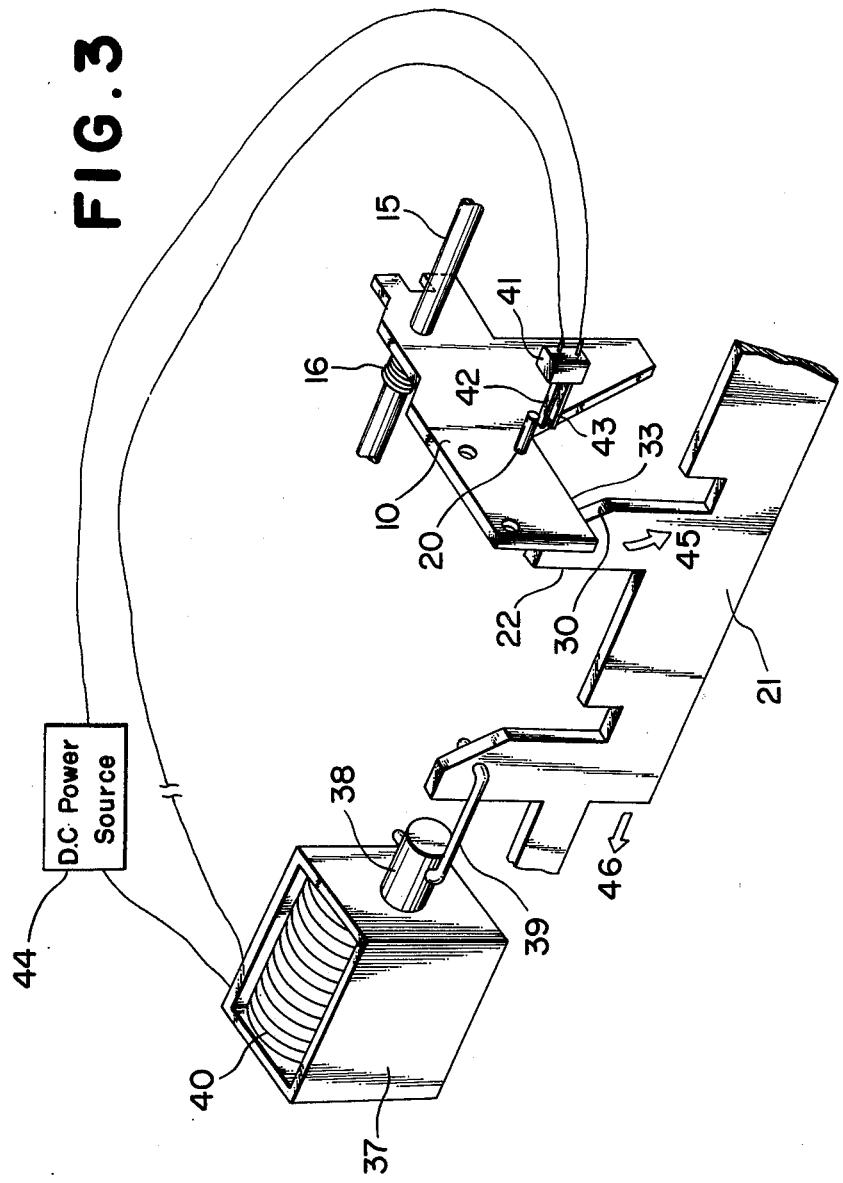

LOCK RELEASE MECHANISM FOR PUSH BUTTON LEVERS IN A TAPE RECORDER

BACKGROUND OF THE INVENTION

The present invention relates to lock release mechanisms for push button levers such as used in a tape recorder.

It is well known in the tape recorder art to select the mode of tape recorder operation such as playback, fast wind, rewind, and record by pressing down the appropriate push buttons on the tape recorder until the associated mechanical levers are locked in place. When it is desired to stop an operation thus selected, the stop button is depressed, thereby causing its lever to release any of the other push buttons from the lock position. Two basic types of lock release mechanisms that can be actuated by a stop button lever have been used. One includes a mechanical lock release mechanism which requires a relatively large force from the manual operator for actuation. Another difficulty experienced by the manual operator with the conventional mechanical release mechanism is that the operator usually finds it difficult to stop the tape exactly at the desired point. The other type of release mechanism includes an electrical release means. This type of mechanism, however, will not operate in the event of a power failure or after the power switch is turned off.

SUMMARY OF THE INVENTION

The stop button lever according to the invention is angularly movable until it engages the locking bar and displaces the locking bar out of locking engagement with the push button levers. A solenoid means including an armature coupled to the locking bar is also provided so that upon energization, the lock bar is pulled out of locking engagement with the push button levers. Energization of the solenoid is controlled by a switch which is switched when the stop button is partially pressed down but, for example, before the stop button lever forcibly moves the locking bar.

Accordingly, an object of the present invention is to provide a lock release mechanism for tape recorder push buttons so that a light touch on the stop button by the manual operator is sufficient to cause the tape recorder to stop.

Another object is to provide a lock release mechanism that can be manipulated positively and effectively even if the power to the tape recorder is removed.

Other advantages, features, and objects of the invention will be evident to those skilled in the art upon reference to the detailed description and the accompanying drawings.

BRIEF DESCRIPTION OF THE DRAWINGS

FIG. 3 is a fragmentary perspective view showing a portion of the lock release mechanism according to the invention.

DETAILED DESCRIPTION OF THE PREFERRED EMBODIMENT

Figure 1:
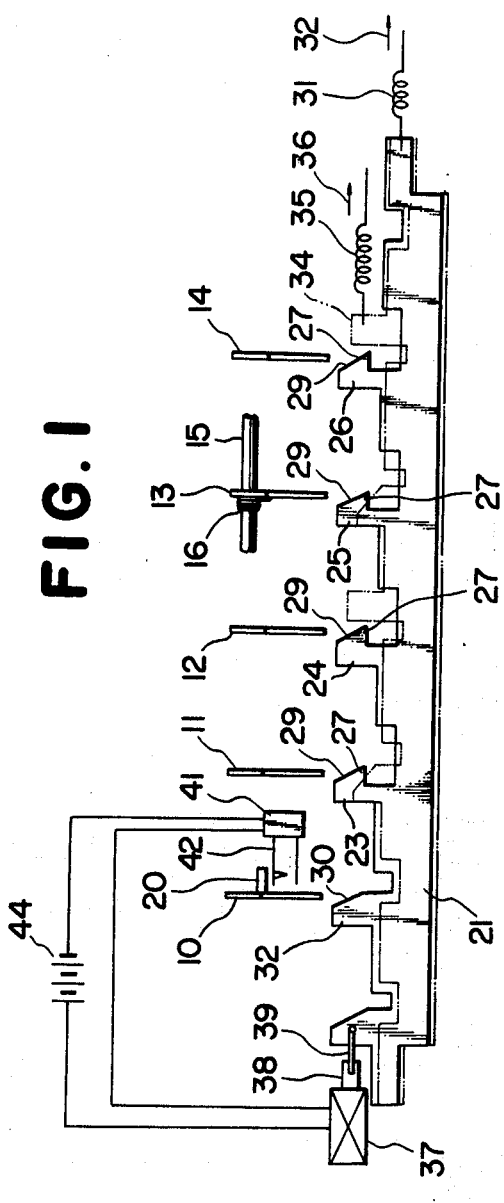
FIG. 1 is a schematic front elevational view of a lock release mechanism constructed according to the invention.

In FIG. 1 a stop button lever 10 and a plurality of push botton levers 11, 12, 13, and 14 such as for rewind, playback, fast wind and record are mounted for angular movement about a rod 15 fixed to a tape recorder chassis (not shown). The levers 10 through 14 are biased by return springs such as spring 16 normally toward an upward direction as viewed in FIG. 1.

Figure 2:
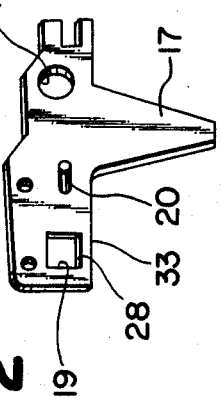
FIG. 2 is a perspective view of one of the push button levers according to the invention.

As shown in FIG. 2, the stop button lever 10 comprises a punched-out plate 17 having a circular hole 18 for the passage therethrough of the rod 15 and a square hole 19 located remotely from the circular hole 18. The push button levers 11 through 14 are also formed of punched-out plates such as plate 17 in a preferred embodiment to reduce the number of different mechanical parts in the tape recorder. Thus, for example, the square hole 19 has no utility as far as the stop button lever 10 function is concerned, but does have utility when plate 17 is used for the levers 11 through 14. The stop button lever 10 is additionally provided with a pin 20 projecting laterally from one side thereof, the pin 20 being positioned substantially midway between the holes 18 and 19.

Referring back to FIG. 1, a locking bar 21 is mounted beneath the levers 10 through 14 within the chassis so that the locking bar 21 is slidable lengthwise. The locking bar 21 has a release projection 22 and a plurality of locking projections 23, 24, 25 and 26 spaced at suitable intervals along the bar 21. The release projection 22 corresponds in position to the stop button lever 10 and the locking projections 23 through 26 correspond in position to the push button levers 11 through 14, respectively. Each of the locking projections 23 through 26 has an appropriately shaped recess in one edge to thereby provide locking prongs 27. Each prong 27 is adapted to be received in the square hole 19 in the respective push button levers 11 through 14 formed from a punch-out plate 17 and to engage with a holding edge 28 of square hole 19 (FIG. 2). Each locking projection 23 through 26 also has a sloped cam surface 29 extending from its free end to the locking prong 27. The release projection 22 has a sloped cam surface 30, but does not have any locking prong. All of the sloped cam surfaces 29 and 30 face in the same direction. The locking bar 21 is urged to the right as viewed in FIG. 1, or in the direction of the arrow 32 by a spring 31 attached to one end thereof so that the cam surfaces 29 and 30 are aligned for engagement with the lower edges 33 of levers 10 through 14 when the levers are depressed.

A blocking bar 34 is disposed in side-by-side relation to the locking bar 21 and is biased by a spring 35 in the direction of the arrow 36. The blocking bar 34 serves as a barrier to prevent certain of the push button levers from being depressed while others are being or have been actuated.

A solenoid 37 has an armature or plunger 38 which is connected by a connector 39 to the end of the locking bar 21 opposite from the end to which spring 31 is connected. The solenoid 37 includes a coil 40 (FIG. 3) connected to a detector switch 41 having electrical contacts 42, 43. A DC power source 44 is connected to the solenoid coil 40 and the switch 41 to provide energization of the solenoid 37 according to the switching state of switch 41. The contacts 42, 43 of the switch 41 which define the switching state of the switch 41 are positioned just below the pin 20 of the stop button lever 10 so that the contacts 42, 43 are mechanically actuated by pin 20 during angular movement of the lever 10. More specifically, the contacts 42, 43 are positioned relative to pin 20 and lever 10 so that the contacts 42, 43 can be closed due to actuation by the pin 20 when the stop button lever 10 is partially depressed or pressed down but before lever 10 is depressed far enough to bring its lower edge 33 into engagement with the cam surface 30 of the release projection 22.

During normal operation of the tape recorder, one of the push button levers, for example, the lever 11 is pressed down and locked in the down position by the locking prong 27 associated therewith engaging the holding edge 28 of the lever 11. At the same time, the stop button lever 10 is held out of engagement with the release projection 22 and the switch 41 is open. When the manual operator then desires to stop the tape recorder, he depresses the stop button lever 10. The lever 10 is first slightly depressed and is then further depressed in the direction of the arrow 45 in FIG. 3 until the pin 20 actuates and closes the contacts 42, 43 of switch 41, thereby energizing the solenoid coil 40. Energization of the solenoid coil 40 causes the armature 38 to be pulled in which, in turn, moves the locking bar in the direction of the arrow 46 shown in FIG. 3, against the biasing force of the spring 31. The locking prong 27 of the lever 23 is then displaced out of engagement with the holding edge 28 of the locked lever 11, thereby allowing the lever 11 to spring back to its initial raised position as shown in FIG. 1.

Thus, it is seen that it is sufficient for the manual operator to exert a small pressure on the stop button to effect a complete lock release operation. With this arrangement, a running tape can be stopped immediately upon slight depression of the stop button. However, when the solenoid 37 cannot be energized, or in the event of a power failure, the stop button lever 10 may be further depressed until its lower edge 33 displaces the release projection 22 by a slidable engagement with the cam surface 30, whereupon the locking bar 21 is also shifted in the direction of the arrow 46 to thereby bring the locking projection 27 out of engagement with the push button lever 11.

The lock release meahanism of the present invention can also be applied to a pivotable locking bar which is actuatable for lock release operation by a stop button lever through a pivotal member.

Although the present invention has been described in terms of a particular embodiment, it is to be understood that various changes and modifications may be made without departing from the scope of the appended claims.

What is claimed is:

1. A lock release mechanism for push button levers in a tape recorder comprising:
   a stop button lever mounted on the tape recorder for angular movement and having a first and a second engaging portion;
   a plurality of push button levers moveably mounted on the tape recorder;
   a locking bar having a plurality of locking projections spaced along its length for locking engagement with said push button levers and having a release projection having a cam surface disposed for slidable engagement with said first engaging portion, said locking bar being urged lengthwise by a spring in a first direction, said locking bar being shiftable lengthwise in a second direction opposite to said first direction against the force from said spring toward a position wherein said locking projections are held back out of engagement with the push button levers when said first engaging portion of said stop button lever displaces upon its angular movement said release projection by slidable engagement with said cam surface;
   a solenoid having a coil and an armature, said armature being mechanically connected to said locking bar; and
   a switch electrically connected to said coil, said solenoid being energizable upon closing of said switch to thereby enable said armature to pull said locking bar in said second direction toward said position against the bias of said spring, and said switch being closable by said second engaging portion of said stop button lever upon its angular movement prior to displacement by said first engaging portion of said release projection.

2. A lock release mechanism according to claim 1 wherein said second engaging portion comprises a pin projecting laterally from said stop button lever and said switch includes electrical contacts positioned so as to be actuated by said pin during angular movement of said stop button lever.

* * * * *